United States Patent [19]

Ohzono

[11] 4,448,436
[45] May 15, 1984

[54] LOCKING SYSTEM FOR ROLLING-TYPE TRICYCLE

[75] Inventor: Kohei Ohzono, Saitama, Japan

[73] Assignee: Honda Giken Kogyo Kabushiki Kaisha, Tokyo, Japan

[21] Appl. No.: 397,160

[22] Filed: Jul. 12, 1982

[30] Foreign Application Priority Data

Jul. 14, 1981 [JP] Japan ................... 56-109750

[51] Int. Cl.³ .............................................. B62K 5/06
[52] U.S. Cl. ..................................... 280/282; 180/210
[58] Field of Search ............... 180/210, 215, 216, 217; 280/282, 112 A

[56] References Cited

U.S. PATENT DOCUMENTS

| | | | |
|---|---|---|---|
| 4,006,916 | 2/1977 | Patin | 280/282 |
| 4,356,876 | 11/1982 | Watanabe et al. | 180/210 |
| 4,368,796 | 1/1983 | Patin | 180/215 |

*Primary Examiner*—Joseph F. Peters, Jr.
*Assistant Examiner*—D. Lynn Fugate
*Attorney, Agent, or Firm*—Irving M. Weiner; Pamela S. Burt; John L. Shortley

[57] ABSTRACT

A locking system for a tricycle, including a braking mechanism, a rolling restraint mechanism, a driving mechanism which drives the braking mechanism and the rolling restraint mechanism, a control mechanism for applying control signals, and a detecting mechanism for applying a speed signal to the driving mechanism when a vehicle speed is lower than a predetermined value. The driving mechanism selectively or simultaneously drives the braking and restraint mechanisms in response to the control signal, and also drives the restraint mechanism upon receiving the speed signal. With such arrangement, maximum freedom is afforded the driver in assuming a desired posture, even when the tricycle is travelling under low inertia.

24 Claims, 9 Drawing Figures

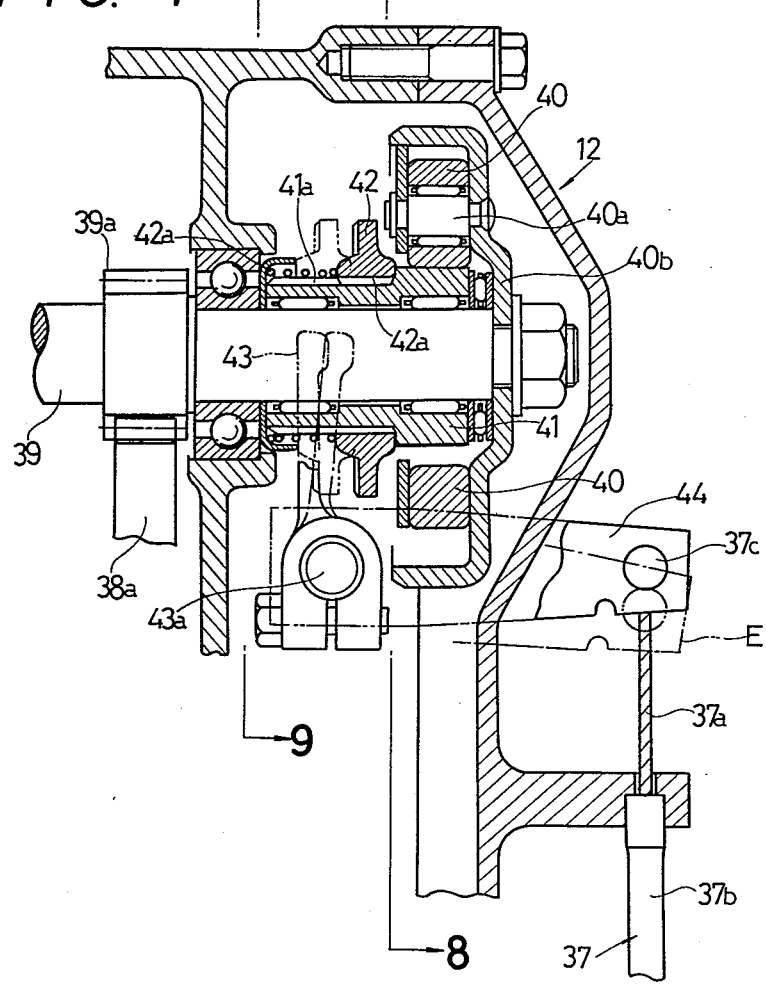

LOCKING SYSTEM FOR ROLLING-TYPE TRICYCLE

Background of the Invention

1. Field of the Invention

The present invention relates generally to a locking system for a tricycle of the rolling type. More particularly, the invention relates to a locking system for a tricycle having a wheel braking mechanism, a rolling restraint mechanism and a control mechanism for the former two mechanisms.

2. Description of Relevant Art

In a motor driven tricycle having one front wheel, two rear wheels and front and rear bodies coupled together through a supporting shaft for relative rolling movement, it is well known to provide a locking system comprising a braking mechanism for braking the two rear wheels, a restraint mechanism for locking the front body against rolling thereof and a control mechanism for causing the braking mechanism and the restraint mechanism to brake and lock, respectively.

In such a conventional rolling-type tricycle, problems have arisen with respect to improving convenience in handling of the tricycle as well as the degree of comfort afforded the driver by functionally combining the wheel braking mechanism, the rolling restraint mechanism and the control mechanism for the former two mechanisms. In a particular tricycle of the type in which the driver's feet can be rested on a low level floor when driving, it is important to permit the driver to assume a riding posture as freely as possible even when the tricycle is in a state of having a relatively low or substantially no moving speed.

The present invention effectively overcomes the aforesaid problems attendant the conventional locking system of a rolling-type tricycle.

Summary of the Invention

The present invention provides a locking system in a rolling-type tricycle having front and rear bodies coupled together so as to permit relative rolling movement therebetween. The locking system includes a braking mechanism for braking at least one wheel of the tricycle; a restraint mechanism for locking the relative rolling movement; a driving mechanism for selectively or simultaneously causing the braking and restraint mechanisms to perform braking and locking operations, respectively, in response to predetermined first signals, and for causing the restraint mechanism to perform a locking operation in response to predetermined second signals; a control mechanism for applying the first signal to the driving mechanism; and a detecting mechanism for detecting the speed of the tricycle and for applying the predetermined second signal to the driving mechanism when the speed detected is lower than a predetermined value.

An object of the present invention is to provide, in a rolling-type tricycle having a wheel braking mechanism, a restraint mechanism and a control mechanism for the former two mechanisms, in the form of a locking system which permits a driver to assume a riding posture as freely as possible even when the tricycle has a low speed of travel.

The above and further objects, details and advantages of the present invention will become apparent from the following description of preferred embodiments thereof, when read in conjunction with the accompanying drawings.

Brief Description of the Drawings

FIG. 7 is an enlarged transverse-sectional view showing a speed detecting mechanism in the locking system shown in FIG. 1.

Detailed Description of Preferred Embodiments

Figure 1:
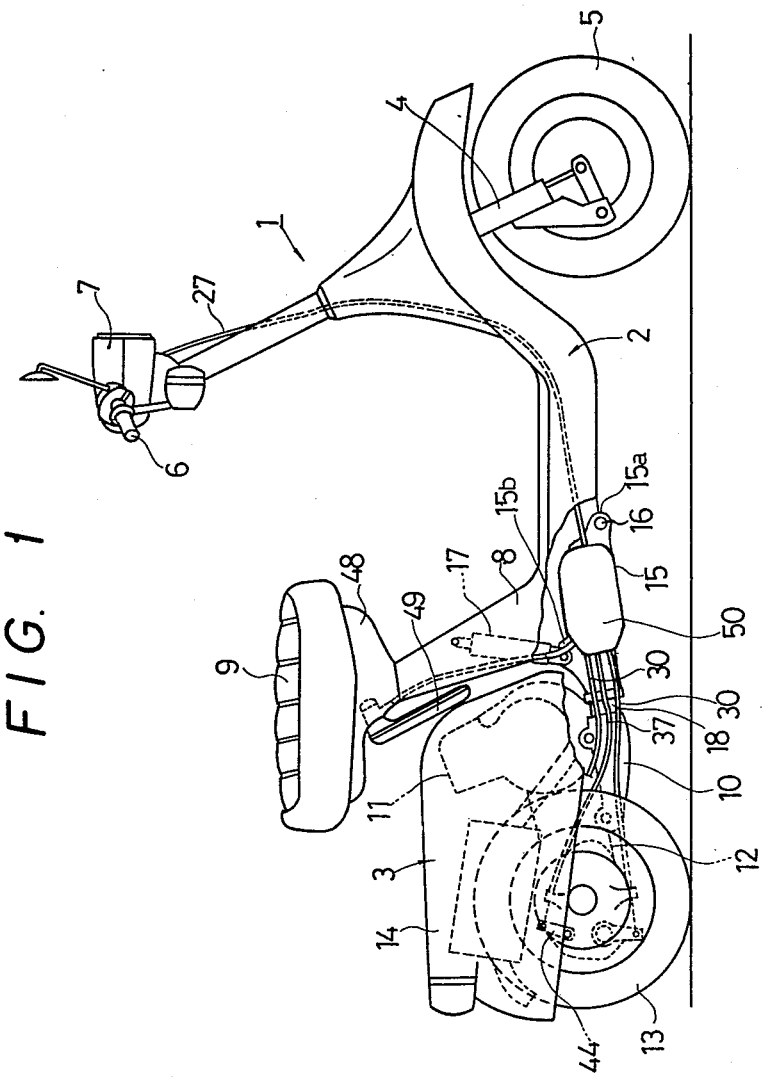
FIG. 1 is an elevational view schematically showing the right side of a rolling-type tricycle provided with a locking system in accordance with the present invention, which is partly broken away around a swingable joint.

With reference to FIG. 1, there is shown a tricycle 1 having a main body divided into a front body 2 and rear body 3. The front body 2 is provided in the front portion thereof with a front wheel 5 which is steered through a front fork 4 extended upwardly and provided with a handlebar 6 at the top end thereof. A headlight unit 7 is attached to the handlebar 6 at the intermediate portion of the latter. Further, a seat post 8 provided at the top end thereof with a seat 9 is disposed so as to extend upwardly in the rear portion of the front body 2. On a rear frame 10 defining the main portion of the rear body 3 is mounted an engine 11 having a gear casing 12 connected thereto. Two rear wheels 13, which are drive wheels, are respectively provided on the left and right sides of the gear casing 12. The engine 11 and the casing 12 are covered by a cover 14.

A swingable joint 15 is pivotally mounted through right and left boss portions 15a at its front end to the lower rear end of the front body 2 by means of a pin 16 so as to be vertically swingable about the pin 16. A cushion unit 17 is pivotally connected as its lower end to the boss portion 15b projecting upwardly from the rear portion of the joint 15 and is pivotally connected at its upper end to the intermediate portion of the seat post 8.

Figure 2:
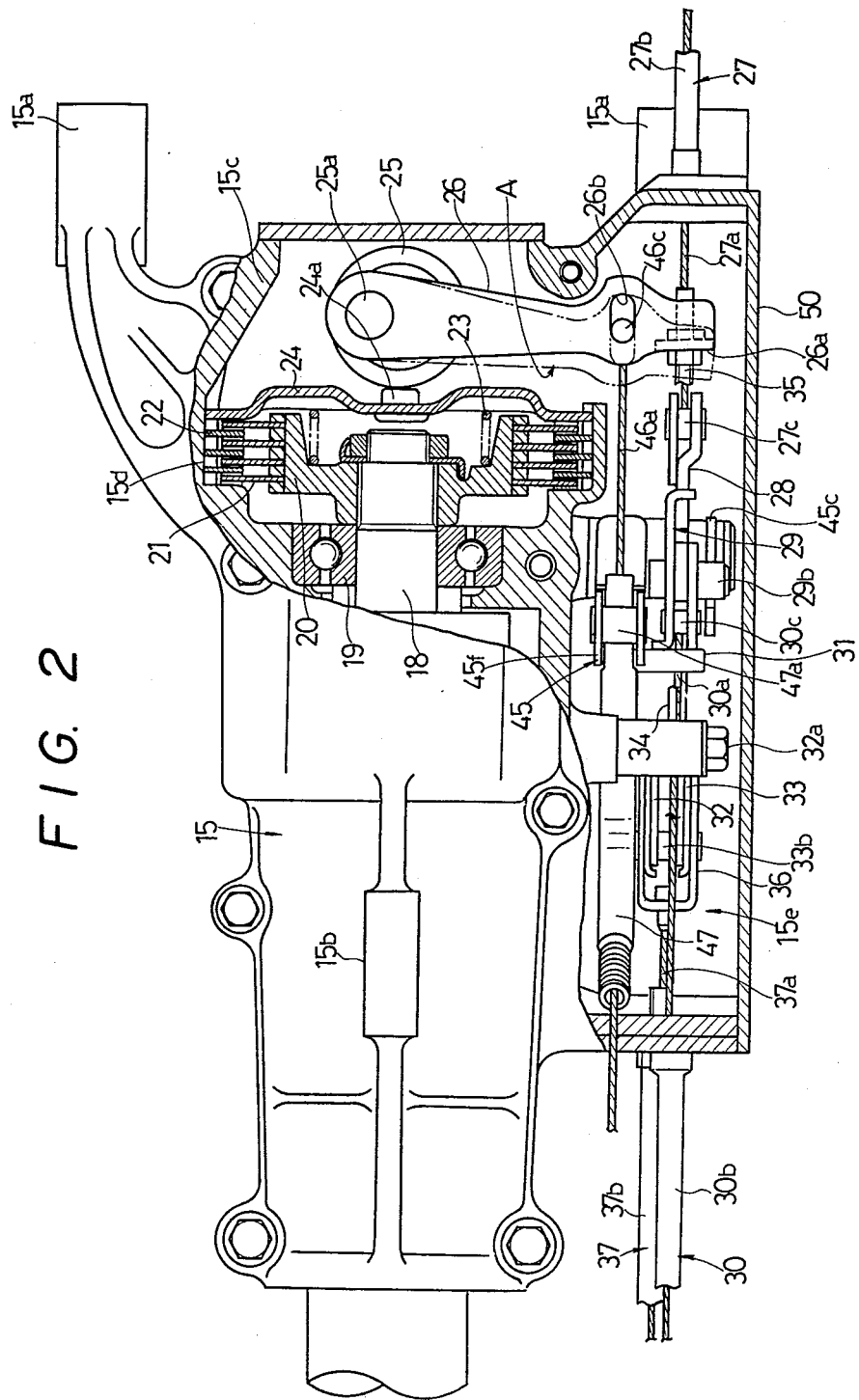
FIG. 2 is an enlarged view showing an essential portion of the swingable joint illustrated in FIG. 1, which is partly broken away.

With reference to FIG. 2, the joint 15 is rotatably fitted through a bearing 19 to the front portion of a supporting shaft 18 secured to the rear frame 10 and extending in the longitudinal direction thereof, so as to be swingable around the supporting shaft 18, i.e., the front body 2 is capable of rolling relative to the rear body 3. Preferably, a Neidhart damper (not shown) is installed in the joint 15 so as to be disposed around the supporting shaft 18, thereby easing rotating movement around the supporting shaft 18. The joint 15 has a hollow casing having its lengthwise axis extending substantially in the longitudinal direction of the tricycle, and is provided with a plurality of flexible control discs 21 (defining first disc members) carried by a holder 20 of a clutch inner type which is fitted onto the front portion of the supporting shaft 18 and a plurality of braking discs 22 (defining second disc members) each of which is disposed in each annular groove 15d formed in the inner wall of the front portion 15c of the joint 15, and each being arranged between adjacent control discs 21. A pressure plate 24 (defining a pressing member) which is urged by a spring 23 to move away from the free end of the supporting shaft 18, i.e., in the rightward direction in FIG. 2, and which has at its center a boss 24a abutted against an eccentric cam 25, is arranged so as to oppose the free end of the shaft 18 and is held by the inside wall of the front portion 15c of the joint 15. The swinging motion, in the leftward direction, of a locking arm 26 (defining a third input portion and a second output mechanism), which is shown by a chain line A in FIG. 2 in its leftward moved position and which is connected in its base portion (defining a second output portion) to a crank pin 25a fitted to the eccentric cam 25, forcibly moves the boss 24a of the pressure plate 24 so as to frictionally engage both groups of the discs 22, 21 with each other, to thereby lock the rotation of the joint 15 around the supporting shaft 18, resulting in the front body 2 being locked against rolling motion thereof.

Referring to FIGS. 3 through 6, the front wall 15f of a recess 15e which is formed in one side of joint 15, for example in the right side in this embodiment, is secured with the lower end of the outer flexible tube 27b of a brake cable 27. The upper end of the inner cable 27a of the brake cable 27 is connected to a control member, such as for example a brake lever or a brake pedal (not shown). The lower end of the inner cable 27a is connected through a rounded connecting pin 27c to the front end 28a of an equalizer holding plate 28 (defining a first input portion), which is suspended in the front portion of the recess 15e and which has a longitudinally elongated shape and is formed with a first elongated hole 28c extending longitudinally in the intermediate portion 28b thereof. A first output portion in the form of an equalizer 29 having left and right plate members 29a, 29a between which the intermediate portion 28b of the plate 28 is disposed, is connected at the upper rear and lower rear ends thereof through rounded connecting pins 30c with the forward ends of the inner cables 30a of two brake cables 30 for operating braking devices (not shown), so as to brake the left and right rear wheels 13. A first pin 29b, fitted to and crossing through the intermediate portion of the equalizer 29, is slidably engaged in the elongated hole 28c.

Figure 3:
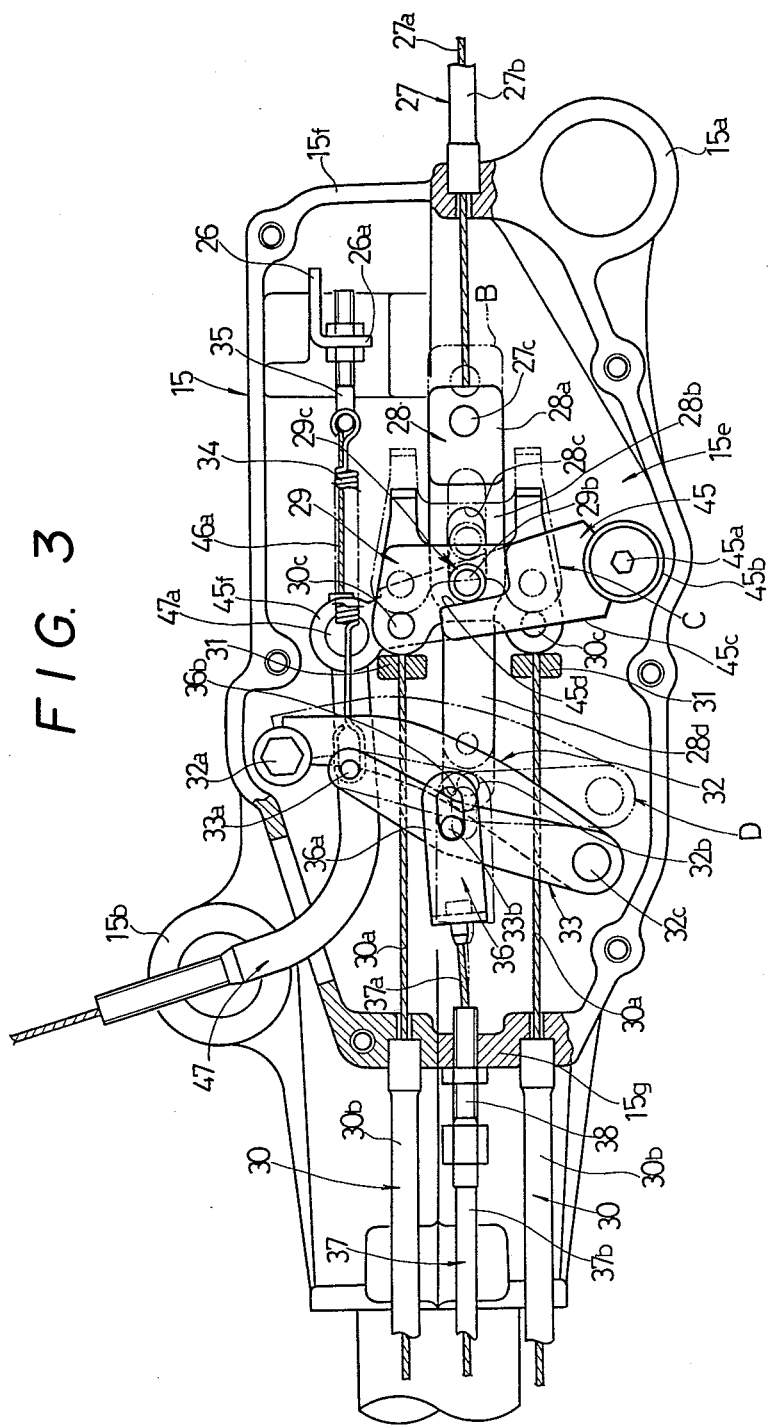
FIG. 3 is a view showing the right side of the swingable joint shown in FIG. 2, with the cover thereof being removed and the swingable joint partly broken away, and with the operational position of the locking system, when a braking cable is being pulled, being shown by a phantom line.
Figure 4:
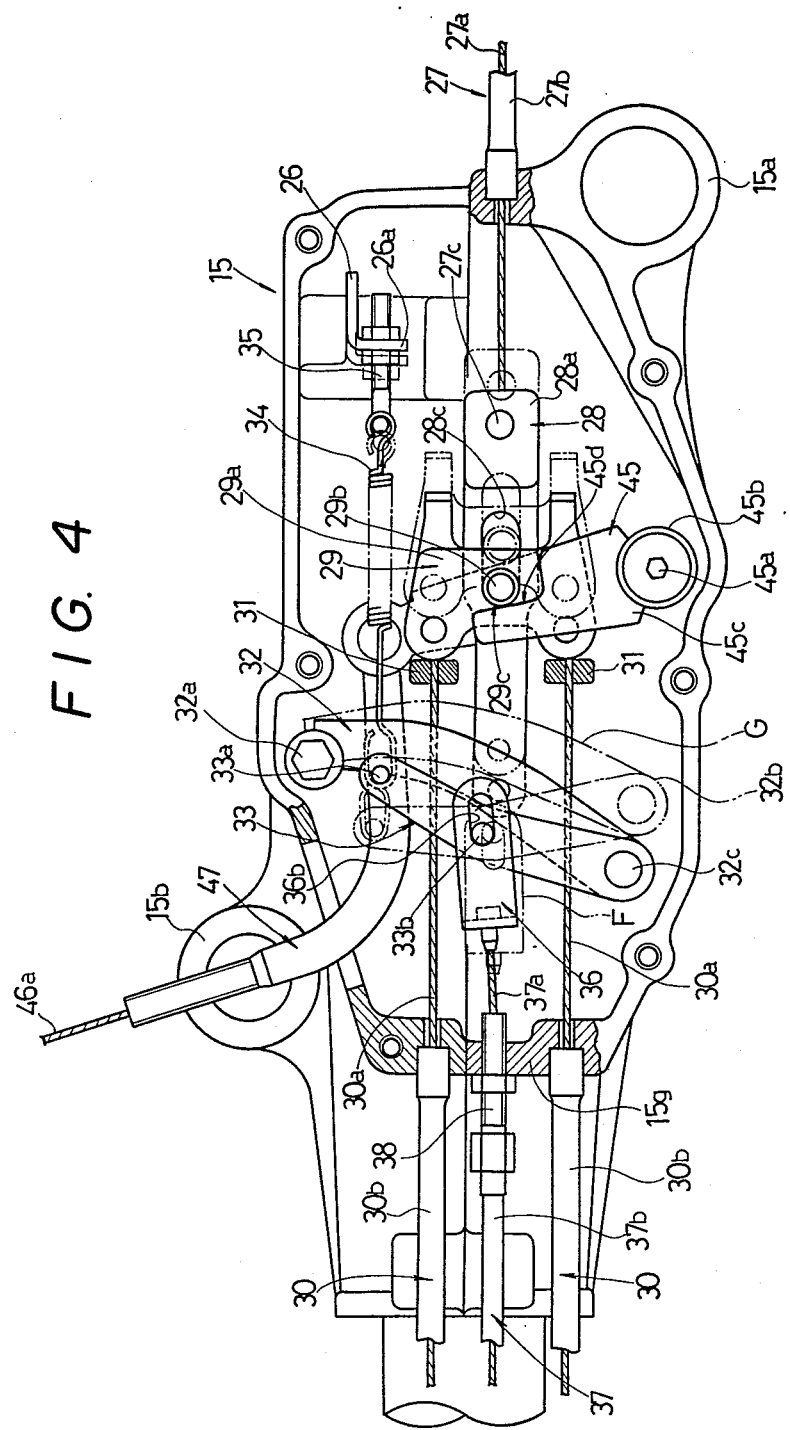
FIG. 4 is a view similar to FIG. 3, showing in phantom line the operational position of the locking system during relatively high speed operation of the tricycle.
Figure 5:
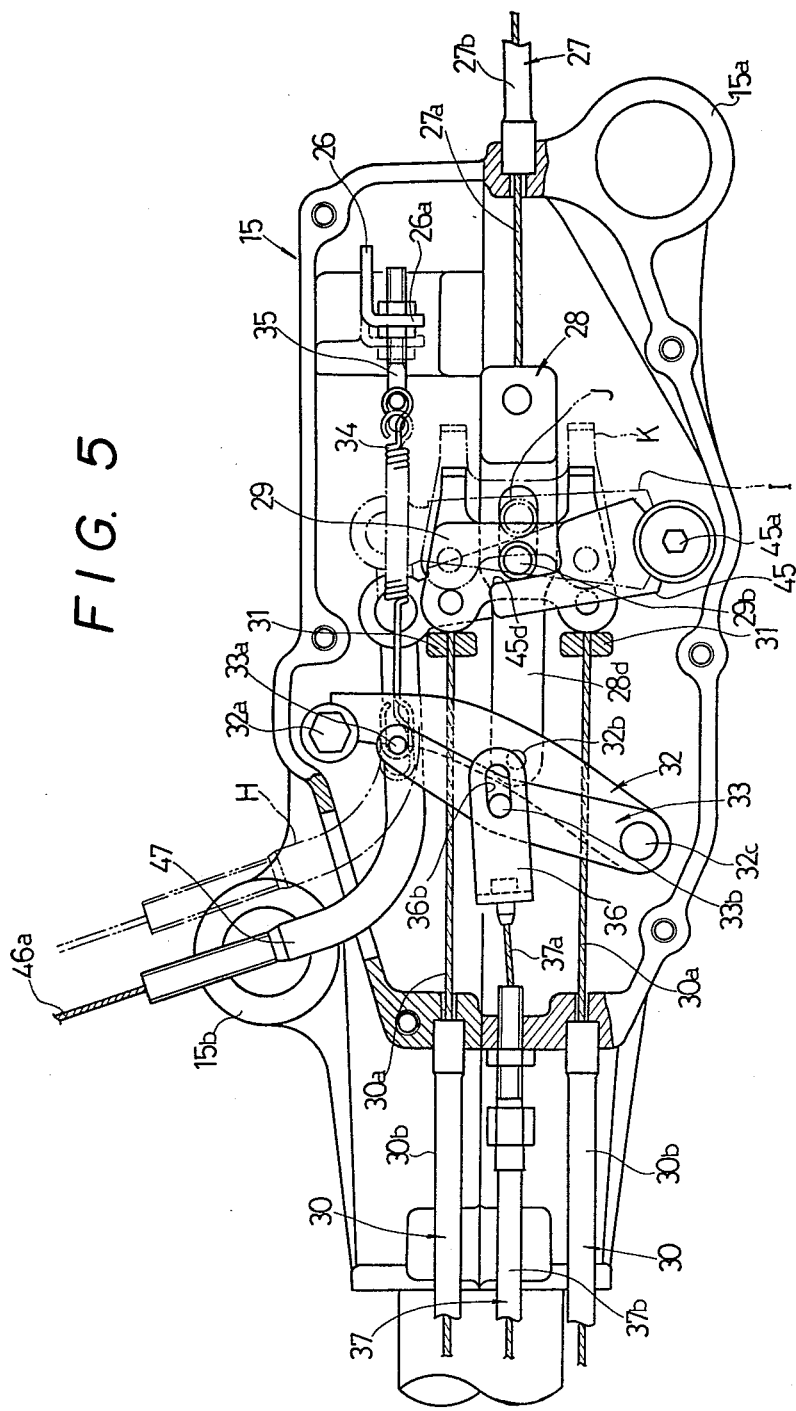
FIG. 5 is a view similar to FIG. 3, showing in phantom line the operational position of the locking system when a control cable is being pulled.
Figure 6:
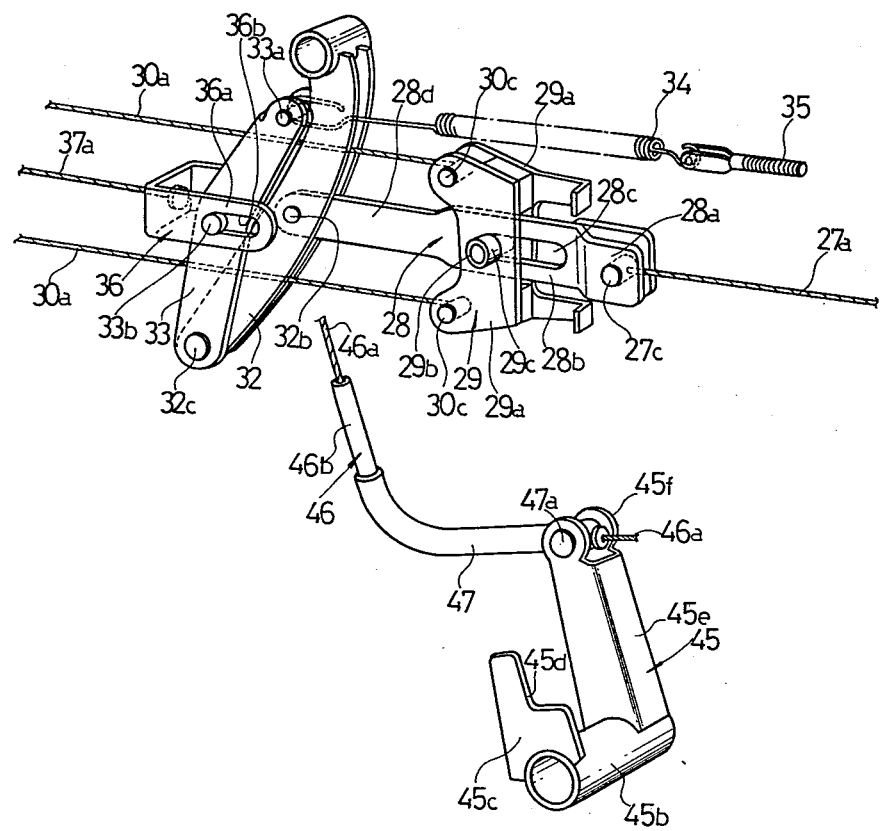
FIG. 6 is an enlarged perspective view showing the essential portion of the locking system disposed in the swingable joint illustrated in FIG. 2, the locking system being partly exploded.

Accordingly, when the inner cable 27a of the brake cable (defining a first input member of a first input mechanism) is pulled so as to supply a first signal, the plate 28 is moved forwardly (rightwardly in FIGS. 3 through 5) as shown by a chain line B in FIG. 3, the equalizer 29 engaged through the elongated hole 28c is also moved as shown by a chain line C, and therefore the inner cables 30a (together defining a first output mechanism) are pulled so as to brake both rear wheels 13. In FIGS. 3 through 5, reference numeral 31 denotes supporting portions each serving as both a guide for each of the upper and lower cables 30 and a stopper for the equalizer 28. Further, the forward ends of the outer flexible tubes 30b of the brake cables 30 are secured to the rear wall 15g of the joint 15.

The rear end of the rear portion 28d projecting rearwardly from the plate 28 defines a fifth input portion which is pivotably connected through a pin 32b to the intermediate portion of a first link 32, the upper end of which is swingably and pivotally supported with a pin 32a as a pivot by the inside wall of the recess 15e and the lower end of which is pivotally connected through a pin 32c to the lower end portion of a second link 33. Each link 32, 33 comprises a unitary member defined by left and right elongated plates, the first link 32 being positioned between the plates of the second link 33 which allow the inner cable 30a to pass therethrough for extending rearwardly. Further, a coupling pin 33a provided at the upper end or free end of the second link 33 is hooked by one end of a spring 34 (defining a third output portion), the other end of which is connected through an adjusting member 35, for suitably adjusting a spring load by the spring 34, to a bent and suspended portion 26a or forward end portion of the locking arm 26.

Between left and right arm portions 36a of an actuating plate 36 (defining a sixth input portion) having a substantially U-shape is loosely held the intermediate portion of the second link 33. A third pin 33b provided in the intermediate portion of the second link 33 is loosely fitted in third elongated holes 36b each formed in each of the left and right arms 36a and extending in the longitudinal direction. The rear end of the actuating plate 36 is coupled to the forward end of the inner cable 37a of an actuating cable 37 (defining a second input mechanism). The forward end of the outer flexible tube 37b is secured to a wall 15g through an adjusting member 38.

Upon braking by means of the pulling action of the cable 27 which causes the plate 28 to move rightwardly in FIG. 3, the first link 32 swings counterclockwise around the pivot pin 32a, and therefore the second link 33 is also moved rightwardly through the pin 32c, so as to assume the position shown by a chain line D in FIG. 3. However, because the pin 33b of the second link 33 slides along the elongated hole 36b, no force in the rightward direction in FIG. 3 is exerted on the actuating plate 36. Accordingly, the input force of braking is isolated from the cable 37a.

Figure 9:
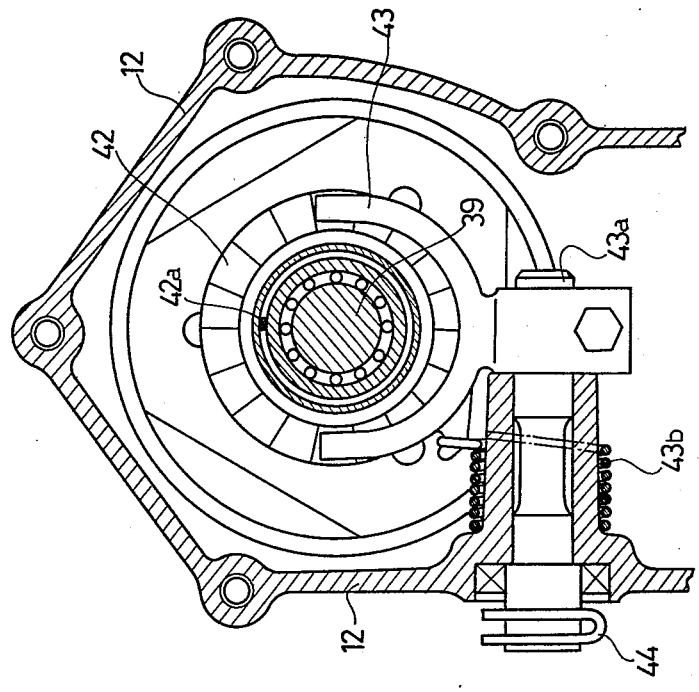
FIG. 9 is a cross-sectional view taken along line 9—9 in FIG. 7.
Figure 8:
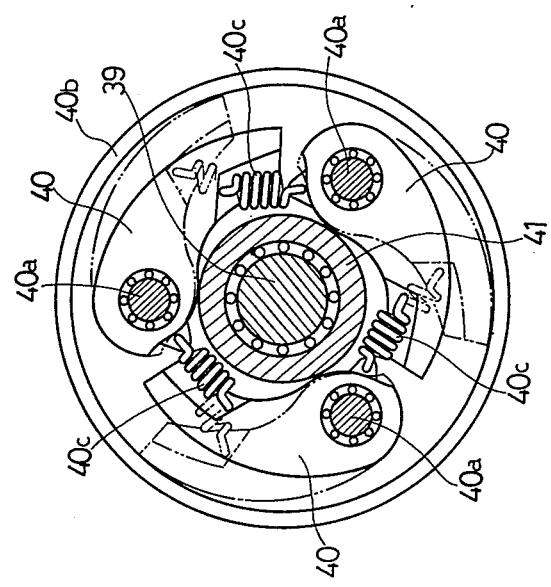
FIG. 8 is a cross-sectional view taken along line 8—8 in FIG. 7.

Referring to FIGS. 7 through 9, in the gear casing 12 there is provided a driven shaft 39 (defining a first shaft member) which is driven by a gear 38a through a gear 39a meshed with the latter upon the rotation of a wheel axle (not shown). The free end portion of the driven shaft 39 is secured with a holder 40b (defining a clutch outer member) holding a plurality of governor weights 40 (defining clutch inner members) adapted to spread under the action of centrifugal force and inside which a cylindrical detecting shaft 41 (defining a second shaft member) is rotatably fitted onto the shaft 39. A coarse thread portion 41a formed in the outer periphery of the detecting shaft 41 is threadedly engaged with a slider 42 (defining a slidable member) having a coarse thread portion in the inner diameter portion thereof and urged by a spring 42a in the restoring direction thereof. A pin 43a, pivotally supporting a fork member 43 (defining a lever member) which cooperates with the slider 42, is fitted in the base end portion of the arm 44 having the forward end thereof extending outwardly from the casing 12. The rear end of the inner cable 37a of the cable 37 is connected through a rounded connecting pin 37c to the forward end of the arm 44.

When the wheel axle is rotated at a speed higher than a predetermined value, rotation of the driven shaft 39 urges the governor weights 40 to spread so as to overcome the force of spring 40c (FIG. 8), the weights 40 therefore separating from the detecting shaft 41, and thereby the driven shaft 39 runs idly with the detecting shaft 41 not being moved. When the vehicle speed is lower than the predetermined value, the weights 40 are closed so as to engage with the detecting shaft 41 which is therefore driven, causing the slider 42 which is engaged through the coarse thread portions with the detecting shaft 41 to move leftwardly in FIG. 7 so that the fork 43 swings counterclockwise, overcoming the force of spring 43b (FIG. 9), and the arm 44 also swings from a position shown by a chain line E to a position shown by a solid line in FIG. 7, to thereby pull the inner cable 37a.

Accordingly, when the inner cable 37a is pulled at the decreased speed which is lower than the predetermined value, including, of course, zero or nil speed, thus supplying a second signal, the actuating plate 36 connected with the forward end of the inner cable 37a is retarded, as shown in FIG. 4, so as to assume a position as shown by a chain line F, to thereby pull the pin 33b rearwardly by striking of the latter against the forward end of the elongated hole 36b in which the pin 33b is engaged. The second link 33 swings leftwardly in FIG. 4, i.e., in the counterclockwise direction, around the pin 32c, the upper end of the second link 33 moving to a relatively large extent in the rearward direction, so that the links 32, 33 are opened, formed a substantially V-like shape as shown by a chain line G. As a result, the spring 34 is extended and the locking arm 26 swings counterclockwise, assuming a position as shown by the phantom line A in FIG. 2, so that rotation of the joint 15 around the supporting shaft 18 is inhibited to lock the relative rolling between the front and rear bodies 2, 3.

In addition to the above-described construction, an actuating arm 45 (defining part of a second input portion) for the parking brake, which is provided at both ends of the boss portion 45b at the lower end portion thereof with spaced arm portions 45c, 45e and which is pivotally supported by a pin 45a extending through the lower end portion, is disposed in the lower intermediate portion of the recess 15e of the joint 15. A substantially L-shaped engaging shoulder portion 45d is formed in the forward end portion of the arm portion 45c, and the aforesaid equalizer 29 is disposed between both arm portions 45c, 45e with one projecting end 29c of the pin 29b being abutted against the rear end of the engaging shoulder portion 45d. The other arm 45e is upwardly extended and has an upper forked end 45f to which the lower end of a rigid substantially L-shaped member 47 (defining a part of the second input portion), connected with the lower end of an outer flexible tube 46f of a control cable 46, is coupled through a rounded connecting pin 47a. The lower end of an inner cable 46a (defining a second input member and a fourth input portion) is connected through a second rounded connecting pin 46c with a second elongated hole 26b formed in the forward end portion of the locking arm 26 as shown in FIG. 2. The upper end of the inner cable 46a of the cable 46 is connected to the base portion of a parking brake control lever 49 (defining a lever member) which is pivotally fitted at the base portion thereof to the supporting member 48 disposed between the seat post 8 and the seat 9. In FIG. 1, reference numeral 50 denotes a cover for covering the recess 15.

With the above-described arrangement, when a parking locking operation is performed by swinging the control lever 49 in the normal direction to the plane of FIG. 1, the inner cable 46a is pulled so that the lower end of the inner cable 46a, on the one hand, having pin 46c engaged in the elongated hole 26b of the locking arm 26, is then secured at the extreme position thereof; and the member 47, on the other hand, is pushed toward the upper right in FIG. 5 under the reaction of such engagement. Because the rigid member 47 is substantially L-shaped, member 47 advances or moves rightwardly in FIG. 5, assuming a position as shown by a chain line H, and the arm 45 swings clockwise around the pin 45a as a pivot, assuming a position as shown by a chain line I. As a result, the pin 29b is moved rightwardly by the engaging shoulder portion, assuming a position as shown by a chain line J, so as to move the equalizer 29 rightwardly as shown by a chain line K, causing the inner cable 30a to be pulled to brake the rear wheels 13. In such operation, the pin 29b does not interfere with the normal brake control system for the rear wheels, because it slides in the elongated hole 28c of the plate 28.

As will be clearly understood from the foregoing detailed description, the manipulation of the parking brake control lever 49 actuates the rear wheel braking system, without interfering with the normal brake control system, for locking the rear wheels simultaneously with the self-locking action to prevent rolling.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

I claim:
1. A locking system in a rolling-type tricycle having front and rear bodies coupled together for relative rolling movement, comprising:
   means for braking at least one rear wheel of said tricycle;
   restraint means for locking the relative rolling movement of said bodies;
   driving means, operatively cooperating with said braking means and said restraint means, for causing said braking means and said restraint means to perform braking and locking operations, respectively, in response to predetermined first signals, and for performing said locking of said restraint means in response to predetermined second signals;
   control means for applying said first signals to said driving means; and
   means for detecting a speed of said tricycle so as to apply said second signals to said driving means when said speed is lower than a predetermined value.

2. A locking system according to claim 1, wherein:
   said control means comprises a brake control mechanism for braking said tricycle during travel thereof and a locking control mechanism for braking said tricycle when parking, said first signals including braking and locking signals applied through said braking and locking mechanisms.

3. A locking system according to claim 2, wherein:
said driving means causes said braking means to perform said braking operation when said second signals are absent upon receipt of said braking signal, and simultaneously causes said braking and restraint means to perform said braking and locking operations, respectively, when said second signals are present.

4. A locking system according to claim 3, wherein:
said driving means simultaneously causes said braking and restraint means to perform said braking and locking operations, respectively, when said locking signal is received.

5. A locking system according to claim 4, wherein:
said driving means comprises:
first and second input mechanisms introducing said first and second signals, respectively;
first and second output mechanisms coupled to said braking means and said restraint means, respectively; and
a logical linkage network interposed between said first and second input mechanisms and said first and second output mechanisms, and adapted to function logically;
said logical linkage network including a first linkage interposed between said first input mechanism and said first output mechanism, a second linkage interposed between said first input mechanism and said second output mechanism, and a third linkage interposed between said second input mechanism and said second linkage, said first input mechanism having first and second input members for introducing said braking signal and said locking signal, respectively, and said first and second input members both being connected to said first and second linkages.

6. A locking system according to claim 5, wherein:
said first, second and third linkages have first, second and third switching mechanisms, respectively;
said first switching mechanism comprises first and second input portions (28, and 45, 47) connected to said first and second input members (27a, 46a), respectively, and a first output portion (29) connected to said first output mechanism (30a, 30a);
said second switching mechanism comprises a third input portion (26) connected through said third switching mechanism to said first input portion (28), a fourth input portion (46a) connected to said second input portion (45, 47) and a second output portion (26) connected to said second output mechanism (26); and
said third switching mechanism comprises fifth and sixth input portions (28d, 36) connected to said first input portion (28) and said second input mechanism (37a), respectively, and a third output portion (34) connected to said third input portion (26).

7. A locking system according to claim 6, wherein:
said first and second switching mechanisms comprise first and second AND gates, respectively; and
said third switching mechanism comprises an inhibit gate which does not close unless a predetermined signal is received in said sixth input portion.

8. A locking system according to claim 7, wherein:
said first and second AND gates respectively include first and second elongated holes and first and second pin members slidably fitted in said first and second elongated holes, respectively.

9. A locking system according to claim 8, wherein:
said first input portion comprises a first linearly movable member;
said second input portion comprises a first pivotable member interferable with said first pin member;
said first output portion comprises a second linearly movable member secured with said first pin member;
said third input portion comprises the forward end of a second pivotable member having formed therein said second elongated hole and having a base end which is pivotably supported;
said fourth input portion comprises a pullable member connected to said second pin member; and
said second output portion comprises said base end of said second pivotable member.

10. A locking system according to claim 9, wherein:
said second input portion further comprises a substantially L-shaped movable rigid pipe member having one end pivotally attached to said first pivotable member and a pullable cable extending through said pipe member.

11. A locking system according to claim 7, wherein:
said inhibit gate comprises a first link member having one end pivotally supported, a second link member having one end pivotally supported by the other end of said first link member, a third pin member secured to said second link member and a third elongated hole into which said third pin member is slidably fitted.

12. A locking system according to claim 11, wherein:
said fifth input portion comprises a linearly movable member pivotably attached to said first link member, said sixth input portion comprises a movable member formed therein with said third elongated hole, and said third output portion comprises a pullable member engaged with the other end of said second link member.

13. A locking system according to claim 12, wherein:
said pullable member is connected to said third input portion through a spring mechanism having an adjustable spring force.

14. A locking system according to claim 5, wherein:
each of said first and second input members and said first output mechanism comprises at least one pullable cable.

15. A locking system according to claim 5, wherein:
said second output mechanism comprises a pivotable member.

16. A locking system according to claim 2, wherein:
said braking control mechanism comprises a lever member disposed substantially proximal to a handlebar mounted on said tricycle; and
said locking control mechanism comprises a lever member disposed below a driver's seat mounted on said tricycle.

17. A locking system according to claim 1, wherein:
said front and rear bodies are directly coupled together through a supporting shaft having a rear end secured to said rear body and a joint member having a rear portion rotatably fitted onto the front end of said supporting shaft and a front portion swingably engaged with said front body.

18. A locking system according to claim 17, wherein:

said restraint means comprises a frictional mechanism interposed between said supporting shaft and said joint member.

19. A locking system according to claim 18, wherein:
said frictional mechanism comprises:
   a plurality of first disc members unitarily rotatable together with said supporting shaft;
   a plurality of second disc members unitarily rotatable together with said joint member; and
   a pressing member movable in a direction which causes said first and second disc members to be closely contacted with each other.

20. A locking system according to claim 1, wherein:
said tricycle includes two wheels carried by said rear body.

21. A locking system according to claim 20, wherein:
said braking means comprises braking mechanisms each operatively cooperating with one of said rear wheels.

22. A locking system according to claim 1, wherein:
said detecting means comprises:
   a first shaft member rotatable in proportion to vehicle speed;
   a clutch mechanism operatively cooperating with said first shaft member;
   a rotatable second shaft member coupled to said clutch mechanism;
   a slidable member threadedly engaged with said second shaft member and
   an output mechanism operatively cooperating with said slidable member.

23. A locking system according to claim 22, wherein:
said clutch mechanism comprises:
   a clutch outer member unitarily rotatable with said first shaft member; and
   a plurality of clutch inner members swingably and pivotably mounted so as to respond to centrifugal force, said clutch inner members being pushingly contacted with the outer periphery of said second shaft member when said vehicle speed is lower than a predetermined value.

24. A locking system according to claim 22, wherein:
said output mechanism comprises a lever member pushingly contacted by said slidable member toward the fixing position thereof, and a cable member operatively cooperating with said lever member.

* * * * *